Figure 1:
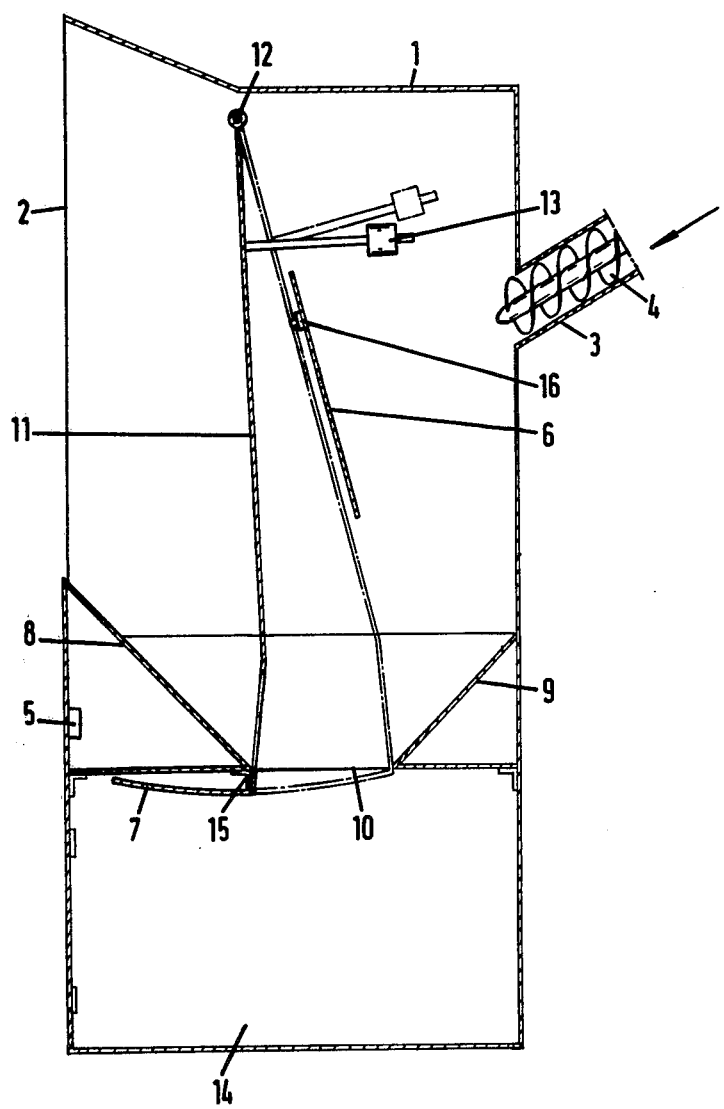

United States Patent [19]

Poiesz

[11] 4,196,697
[45] Apr. 8, 1980

[54] FEEDING APPARATUS

[75] Inventor: Gerardus W. Poiesz, Warnsveld, Netherlands

[73] Assignee: Brinkmann & Niemeijer N.V., Zutphen, Netherlands

[21] Appl. No.: 829,491

[22] Filed: Aug. 31, 1977

[30] Foreign Application Priority Data

Sep. 2, 1976 [NL] Netherlands ........................ 7609780

[51] Int. Cl.² .............................................. A01K 5/02
[52] U.S. Cl. ............................ 119/51 R; 119/52 AF; 119/54
[58] Field of Search ................ 119/51 R, 51.11, 56 R, 119/55, 54, 52 AF

[56] References Cited

U.S. PATENT DOCUMENTS

| 3,465,724 | 9/1969 | Broadbent | 119/51 R |
| 3,850,145 | 11/1974 | Yoder et al. | 119/51 R |

Primary Examiner—Hugh R. Chamblee
Attorney, Agent, or Firm—Watson, Leavenworth, Kelton & Taggart

[57] ABSTRACT

Apparatus for feeding livestock, provided with a housing having a head insertion opening via which the animals can take in the food, and comprising a dosing device for food supply to the housing and responsive to the presence of selected specimens of the animals. There are provided discharge means for food leavings from the housing, said discharge means becoming operative upon removal of the head of an animal from the head insertion opening, and inoperative in the presence of the head of an animal in the head insertion opening.

5 Claims, 2 Drawing Figures

FEEDING APPARATUS

The present invention relates to an apparatus for feeding livestock, provided with a housing having a head insertion opening via which the animals can take in the food, and comprising a dosing device for food supply to the housing and responsive to the presence of selected specimens of the animals.

In such a known apparatus the selected specimens wear a chain or the like about the neck by means of which they can operate a magnet switch disposed at the side of the head insertion opening, and incorporated in the power circuit of the dosing worm motor. Such a chain-wearing animal, during food-intake, will often be pushed aside by an animal not wearing such a chain, and therefore being unable to actuate the dosing worm.

In order to minimize said chasing away, it has already been proposed to effect the food supply in one continuous stream, which stream is tuned to the intake speed of those animals that are slowest in taking in food. However, this has the drawback that the apparatus can be utilized by a limited number of animals. Also the supply of portions is not acceptable, since the larger amounts of supplied food would strongly enhance the chasing away.

It is the object of the present invention to eliminate these drawbacks. To this effect, an apparatus for feeding animals according to the invention is characterized by discharge means for food leavings from the housing, which discharge means become operative upon removal of the head of an animal from the head insertion opening and become inoperative in the presence of a head of an animal in the head insertion opening. As a result no food leavings will remain in the housing when the selected animal withdraws from the apparatus. Moreover, the leavings can be collected and be supplied again.

Another advantage of this construction is that the dosing of portions is possible and that an electronic or mechanical control of the dosages enables an adapted amount of food to be fed to each animal.

The discharge means may be formed by an opening provided in the bottom, said opening being closable by a valve. Said valve may be so suspended as to allow it to be operated by the livestock.

To ensure a proper opening of the aperture, the valve may be responsive to an adjustable counterweight.

In order to further ensure that said opening is completely closed before the dosing device is actuated, the valve may be so suspended that in its closing end position it operates an electric switch incorporated in the power circuit of the dosing device motor.

One embodiment of the feeding apparatus according to the invention will now be explained, by way of example, with reference to the accompanying drawing.

FIG. 1 of the accompanying drawing is an elevational view, partly in section, of the feeding apparatus of the invention.

Figure 2:
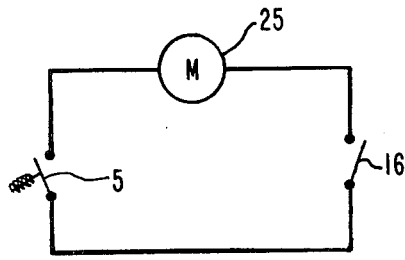

FIG. 2 is a wiring diagram depicting the arrangement of switches which must be closed to allow for operation of the dosing device.

With reference now to FIG. 1, the apparatus includes a housing 1 having a head insertion opening 2 for a cow or the like and a food supply 3 accommodating a dosing worm 4. Said dosing worm can be driven by the motor, not shown, operated by a magnet switch 5. Said magnet switch is responsive to a chain or the like suspended about the neck of a selected cow.

In order to ensure that the cow cannot have access to the dosing worm, the housing accommodates a guard plate 6.

To further ensure that, when a cow is chased away from the dosing device, no food remains in the housing, thus enabling animals for which the food is not destined to take in food, there is disposed in the housing a rotatably suspended valve 7 which is adapted to shut off an opening 10 formed in the housing by two inclined walls 8 and 9. Valve 7 is mounted on a plate 11 adapted for rotation about a shaft 12. At the connection point of the plate 11 with the valve 7, the plate substantially comprises two lateral arms between which there is disposed an opening wherethrough the food present on the valve 7 can be pushed when the valve moves from the dotted to the fully drawn position. The latter will take place under influence of an adjustable counterweight 13 when the cow withdraws its head from the opening 2.

Via opening 10 the food falls into a chamber 14 from where it can be returned to the supply 3.

The movements of the valve 7 and the plate 11 are defined on the one end by the guard plate 6 and on the other end by a stop 15.

On the guard plate there is also mounted an electric switch 16 which is accommodated in the power circuit of the magnet switch 5 and the motor 25 of the dosing worm. As shown in FIG. 2 the magnet switch 5 must be closed by a device worn on the neck of an animal to be fed, and switch 16 must be closed by movement of the closure member 7 (from the full line to dashed line position of FIG. 1) before the motor 25 will operate the dosing device 3. It is thus attained that the worm 4 is not actuated until the opening 10 has been fully shut off by the valve 7.

It will be clear that a great many variants will be possible within the scope of the inventive idea, for instance the opening 10 and the downwardly closing valve 7 may be replaced by a lateral opening and a "sweeping device" disposed adjacent the bottom of the housing.

Another possibility is to also incorporate the means for closing the opening 10 in the power circuit of the magnet switch 5.

I claim:

1. An apparatus for animal feeding comprising a housing having an upper feeding chamber, and a lower food leavings collection chamber, there being a communication port connecting said upper chamber with said lower chamber,
   a closure member supported in said housing and movable between a first position wherein it is disposed adjacent said communication port in unblocking relationship therewith to a second position in which it closes off said communication port,
   a dosing device for supplying food to said upper feeding chamber,
   said housing upper part having an opening thereon for reception of the head of an animal to be fed, the presence of the head of said animal in said housing upper part being effective to move said closure member from its first to second position, and
   switch means associated with rendering said dosing device operable, said switch means including a first switch actuated by movement of said closure member from its first to second position, and a second switch located at the side of said housing upper chamber opening for actuation thereof by a device worn on the neck of an animal to be fed.

2. The apparatus of claim 1 in which said closure member is mounted for pivoting movement between its first and second positions.

3. The apparatus of claim 1 in which said closure member is connected with an adjustable counter weight tending to pivot said valve member in the direction of said first position.

4. The apparatus of claim 3 further comprising stop means defining the extremes of the movement of said closure member between its first and second position.

5. The apparatus of claim 3 wherein said first switch is mounted on one of said stop means.

* * * * *